United States Patent

Olszewski et al.

[11] Patent Number: 6,132,099
[45] Date of Patent: Oct. 17, 2000

[54] RADIAL BEARING FOR A VEHICLE DRIVE SHAFT

[75] Inventors: Piotr Olszewski; Pierre Simon, both of Haguenau; Raphael Wittmann, Roth, all of France; Peter Jennes, Köln, Germany

[73] Assignee: INA Wälzlager Schaeffler OHG, Herzogenaurach, Germany

[21] Appl. No.: 09/180,202

[22] PCT Filed: Apr. 4, 1997

[86] PCT No.: PCT/EP97/01697

§ 371 Date: Nov. 4, 1998

§ 102(e) Date: Nov. 4, 1998

[87] PCT Pub. No.: WO97/43138

PCT Pub. Date: Nov. 20, 1997

[30] Foreign Application Priority Data

May 10, 1996 [DE] Germany .................... 196 18 798

[51] Int. Cl.[7] ................................................. F16C 23/08
[52] U.S. Cl. ........................................................ 384/498
[58] Field of Search .................................. 384/498, 495, 384/537, 209, 210

[56] References Cited

U.S. PATENT DOCUMENTS

| 2,260,418 | 10/1941 | Woller . |
| 2,661,986 | 12/1953 | Herbenar . |
| 2,676,853 | 4/1954 | Shafer . |
| 2,687,926 | 3/1954 | Gair et al. . |
| 2,731,310 | 1/1956 | Potter . |
| 2,906,572 | 9/1959 | Wroby . |
| 3,007,748 | 11/1961 | Firth . |
| 3,623,782 | 11/1971 | Nakanishi . |
| 4,124,257 | 11/1978 | Derner et al. . |
| 4,413,701 | 11/1983 | Kumagai . |
| 4,726,696 | 2/1988 | Dickinson . |
| 5,458,422 | 10/1995 | Zernickel et al. . |

FOREIGN PATENT DOCUMENTS

| 0 394 683 | 10/1990 | European Pat. Off. . |
| 0 439 841 | 8/1991 | European Pat. Off. . |
| 77 386 | 7/1962 | France . |
| 8 89 268 | 9/1953 | Germany . |
| 20 18 581 | 10/1970 | Germany . |
| 22 48 012 | 10/1973 | Germany . |
| 22 22 085 | 11/1973 | Germany . |
| 79 35 867 | 12/1979 | Germany . |
| 33 20 760 | 12/1984 | Germany . |
| 40 04 643 | 8/1991 | Germany . |
| 1 574 765 | 9/1980 | United Kingdom . |

*Primary Examiner*—Lenard A. Footland
*Attorney, Agent, or Firm*—Henry M. Feiereisen

[57] ABSTRACT

The invention relates to a radial bearing assembly for a drive shaft of vehicles which connects a transmission (2) with a driven front wheel (5), with a laterally sealed radial bearing (11a) received in a holder (15) which is securely fixed in place on the side of an internal combustion engine for supporting the drive halfshaft (7). In accordance with the invention, a drive shaft (7) in the form of a hollow shaft is provided, with an inner ring (12a) of the radial bearing (11a) being formed from a sheet metal band in a non-cutting fashion. The radial bearing (11a) is received via a spherically shaped outer surface area (14) of an outer ring (13a) in an oriented position in the holder (15) which is assembled from flanges (16, 17).

15 Claims, 4 Drawing Sheets

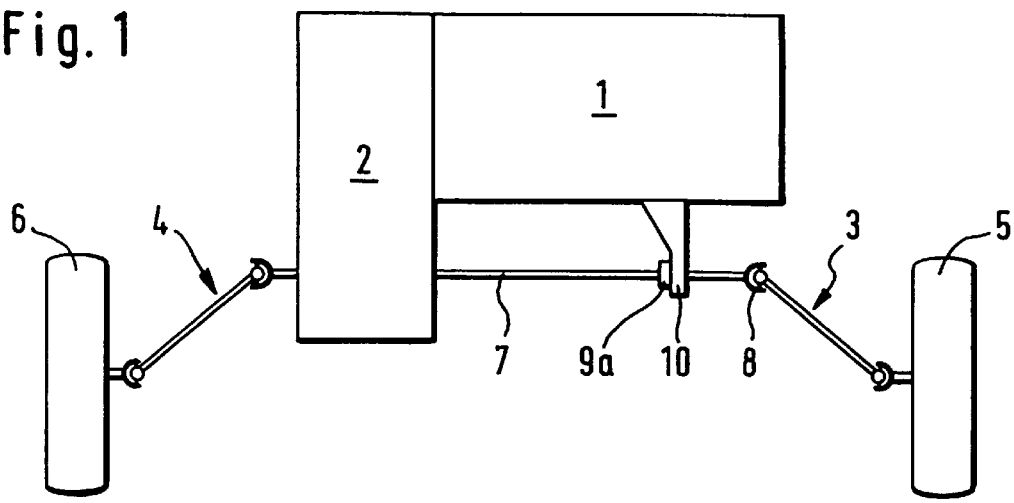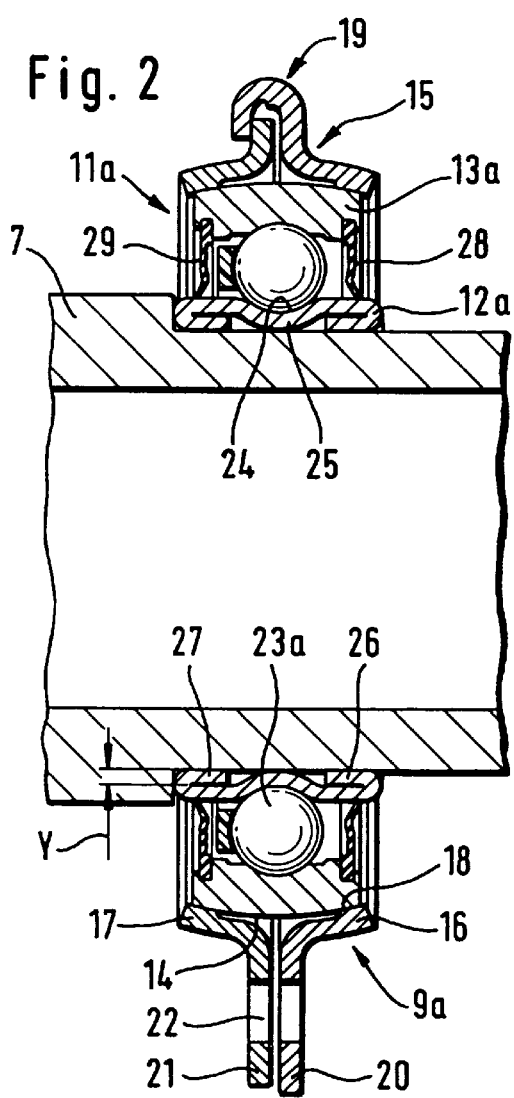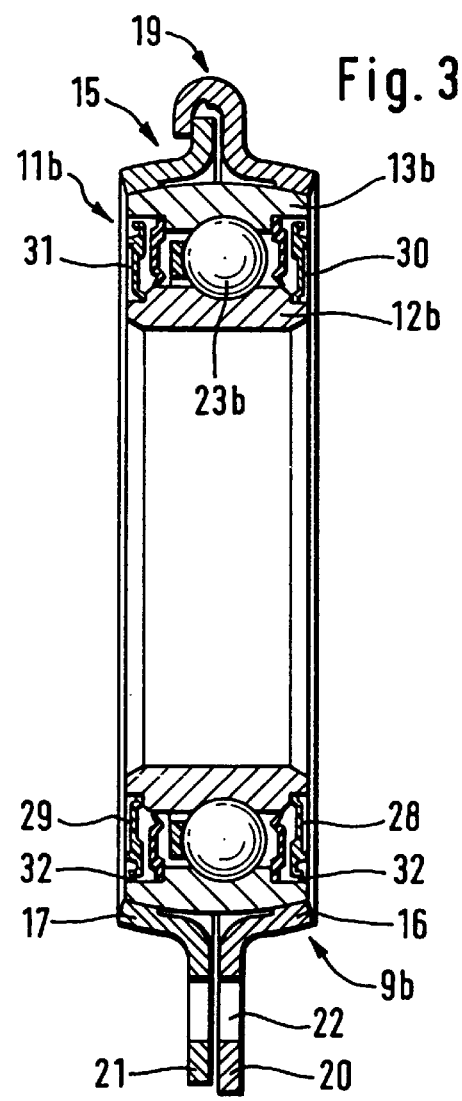

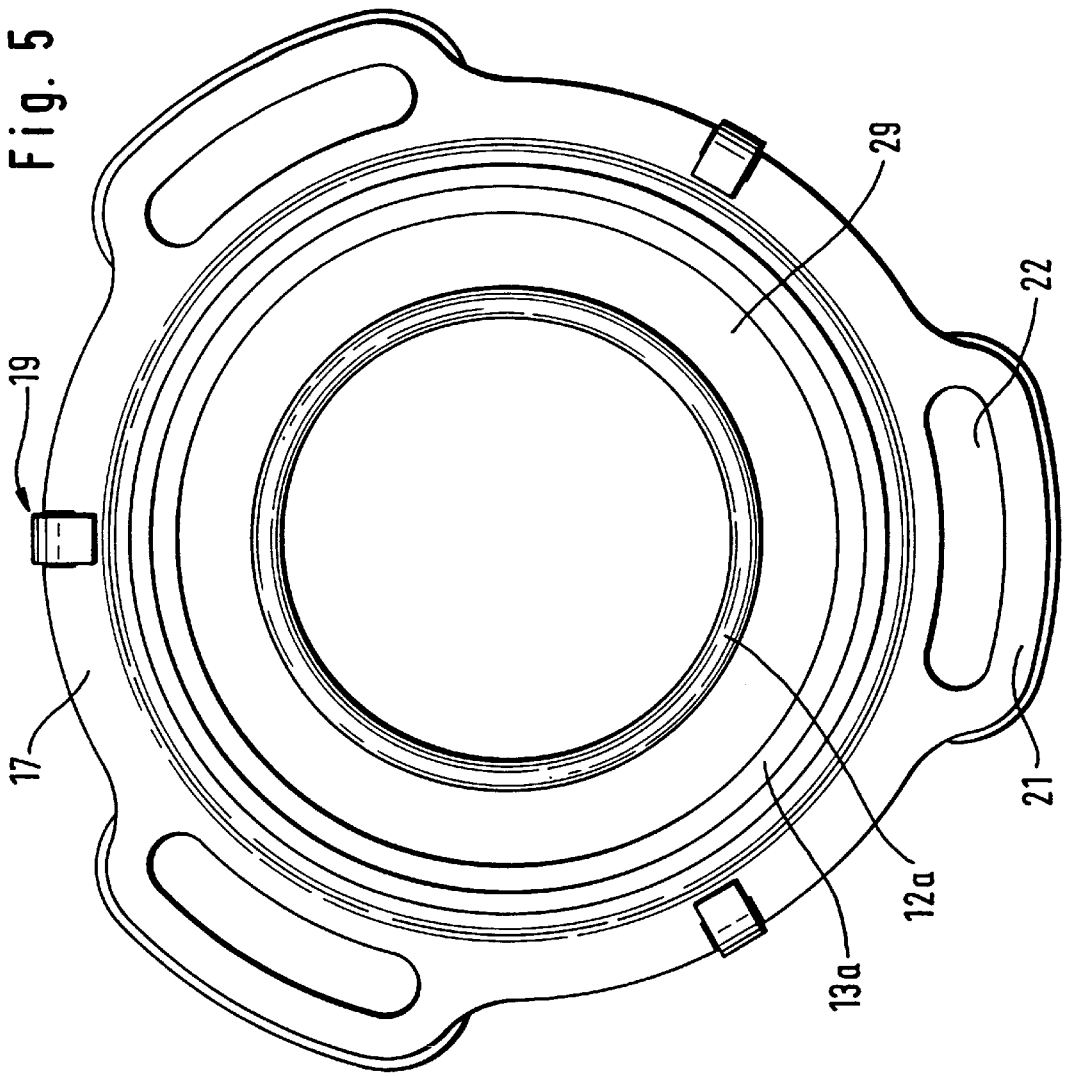
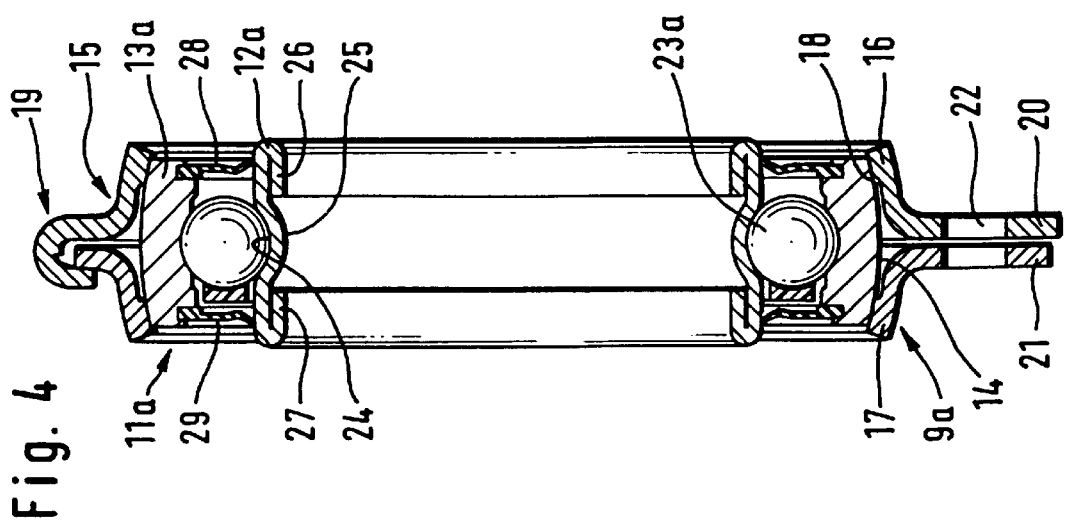

Fig. 6
Fig. 7
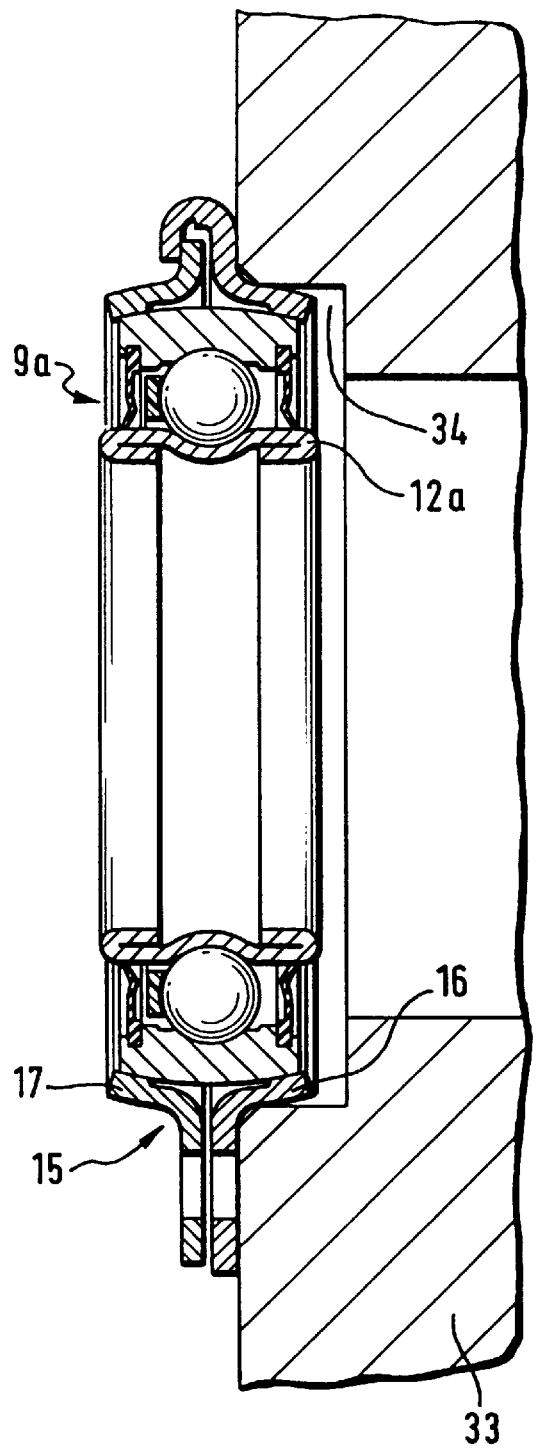
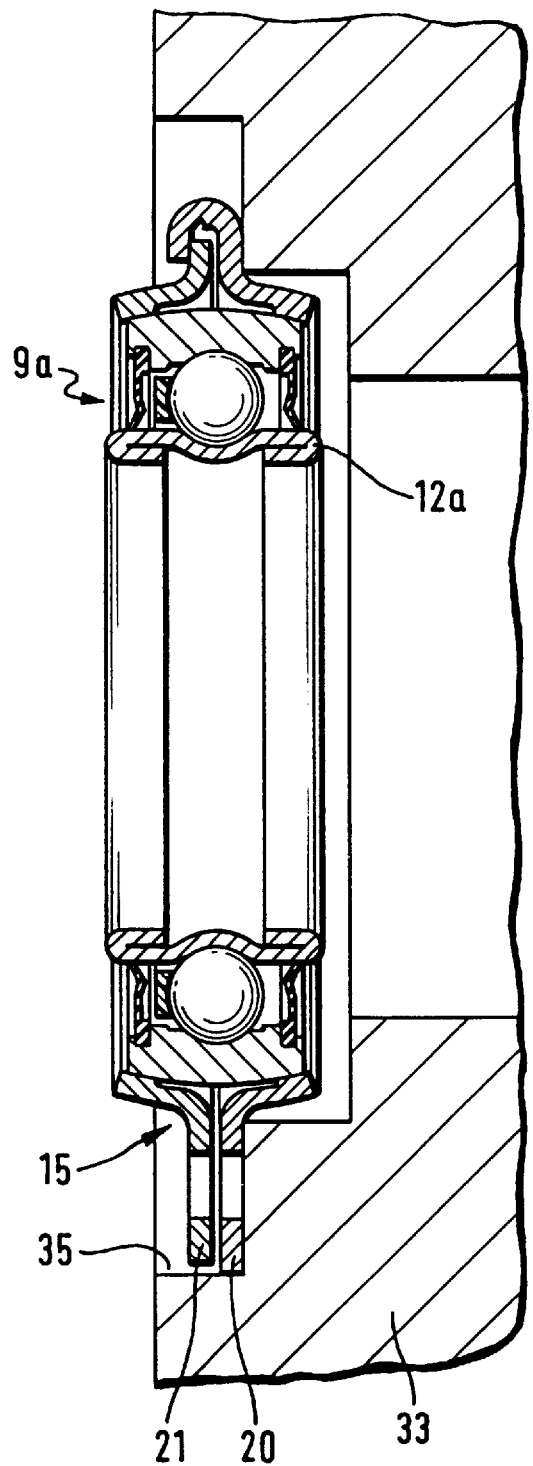

RADIAL BEARING FOR A VEHICLE DRIVE SHAFT

FIELD OF THE INVENTION

The invention relates to a radial bearing assembly for a drive shaft of vehicles, in particular for a drive halfshaft, for connecting a transmission of a transversely mounted internal combustion engine to a driven front wheel, wherein the drive halfshaft is supported by a sealed radial bearing which is received in a holder securely fixed in place on the side of the internal combustion engine.

BACKGROUND OF THE INVENTION

A radial bearing assembly of this type is described in the workshop repair manual (Manual de Reparation N. 8881) for the vehicle Citroen BX, edition of September 1982, chapter 5, page 3. The figure XB 16 illustrates a holder which appears to be mounted on the engine block and supports the drive shaft, with the outer ring of a radial bearing being restrained in the holder against rotation. Secured to the drive halfshaft is the inner ring which is supported by a shoulder that forms an axial stop of the radial bearing. This conventional radial bearing assembly does not allow a self-alignment, i.e. no compensation for a radial offset between the radial bearing and the drive halfshaft during installation. Alignment of the radial bearing is not possible since the outer ring is mounted coaxial with the drive halfshaft in the housing without any clearance, and the housing is attached to the engine block without provisions for adjustment.

U.S. Pat. No. 4,413,701 discloses a support provided for a drive halfshaft and including a holder secured to the engine block for receiving a radial bearing having an inner ring which is secured on the drive halfshaft against rotation. The drive halfshaft has a cardan joint immediately at the transmission output, thereby rendering the need for alignment of the radial bearing unnecessary. The arrangement of a further cardan joint incurs disadvantageously increased manufacturing costs and further complicates installation of the drive shaft.

A further solution for creating a drive halfshaft support which allows a self-alignment proposes a radial bearing assembly which has an outer ring received in a holder or a receiving housing via an elastic intermediate ring. This type of support for a drive halfshaft leads to higher maintenance costs since the elastic intermediate ring as a result of considerable mechanical stress is subject to high wear which is even compounded if the drive halfshaft is out-of-true.

OBJECT OF THE INVENTION

It is an object of the invention to provide a cost-effective radial bearing assembly which supports a drive halfshaft and is arranged in a holder without clearance and can be self-aligned during installation, while yet having a long service life, optimized configuration and still is simple to install.

According to one aspect the invention, an inner ring of the radial bearing is formed from a sheet metal band in non-cutting fashion and fixedly secured in place on the drive halfshaft. The outer ring of the radial bearing is provided with a spherical or crown-shaped outer surface area of the outer ring which is receivable in oriented position in the holder assembled from flanges. The use of the radial bearing with an inner ring formed without cutting results, advantageously, in a reduced wall thickness in comparison to conventional massive inner rings. This thin-walled inner ring has a greater inside diameter while the dimensions of the other components remain the same, so as to permit installation of a drive shaft with a greater outside diameter.

As a consequence of the spherical outer surface area of the outer ring, the radial bearing in the holder can be aligned during assembly and is arranged, for example, at a limited radial offset relative to the drive halfshaft depending on tolerances. This self-alignment in accordance with the invention advantageously ensures a stress-free radial bearing assembly and thereby prevents the bearing from being out-of-true This feature positively impacts the wear behavior of the radial bearing and therefore extends its service life. The exact alignment of the radial bearing relative to the drive halfshaft also positively impacts the noise behavior since the radial bearing assembly thus does not generate any noise. Consequently, the radial bearing assembly according to the invention does not transmit any structure-borne noise to the passenger space of the vehicle that could adversely affect the driving comfort.

According to another aspect of the invention, a holder assembled from flanges in conjunction with a spherical outer ring of the radial bearing can also be combined with a massively configured inner ring of the radial bearing.

The novel construction of the radial bearing according to the inventions can advantageously also be utilized with solid shafts so that components become interchangeable. Consequently, the radial bearing assembly according to the invention can also be used to support a conventional drive halfshaft.

According to another feature of the present invention, the drive halfshaft can be a hollow shaft to reduce weight. Moreover, the rotating mass of the drive shaft is then also reduced so that the drive halfshaft is less likely to run untrue. When a thin-walled inner ring is used, the invention permits in a space that has the same dimensions as a conventional radial bearing, the installation of a drive shaft with a greater outside diameter so that nearly same strength characteristics are realized for a hollow shaft compared to conventional solid shafts.

In order to further reduce the weight, the holder is assembled from two flanges joined positively to one another, with the holder having a receiving contour that matches the spherical outer contour of the outer ring. By matching the shape, the outer ring can be better arranged in the holder without any clearance in the holder to realize a precise guidance of the drive halfshaft so that at the same time a generation of noise in the area near the drive shaft support can be effectively eliminated.

According to one embodiment, the flanges positively contact only a marginal zone of the outer surface area of the outer ring. The contact area between the flange and the outer ring is then reduced to approximately a line, thereby improving in particular the adjusting capability of the radial bearing during installation. Moreover, this type of connection also realizes a secure fit of the radial bearing in the holder.

The subject matter of the present inventions can be further complemented by adding a housing for attachment of the holder. The holder according to the invention can then be combined, for example, with housings that the vehicle maker has already provided and installed in particular on the side of the internal combustion engine. This advantageously offers the possibility to combine the apparatus according to the invention for realizing a self-alignment of the drive halfshaft in the region of the radial bearing with a housing that the vehicle maker already provided as a support for the shaft.

The holder according to the invention includes an adjustable attachment to facilitate centering of the holder on a fixed component, in particular the internal combustion engine or a housing that is installed on the side of the internal combustion engine. This makes it easier to align the radial bearing with respect to the drive halfshaft during installation. Preferably, at least one flange may be provided with fastening clips that have oblong holes to receive fastening screws.

The radial bearing according to the invention has a thin-walled inner ring made in a non-cutting fashion and is associated to a machined massive outer ring, with the radial bearing together with the spherical outer surface area of the outer ring being adjustably inserted into the holder during installation.

To optimize the configuration, the inner ring has a cylindrical collar at least in one axial direction. This collar forms an axial prolongation in the axial direction and replaces a separate spacer ring typically used to date for realizing a fixed bearing seat on the drive halfshaft. To increase the contact area on an attachment member, one end of the collar has a flanged profile projecting radially outwardly at a right angle.

As a result of a non-cutting manufacture of the inner ring formed with a race for rolling elements which contacts the drive halfshaft on the side facing away from the roller elements via an annular bead, a radial gap on one side of the annular bead is realized between the inner ring and the drive shaft. This radial gap can be compensated by lapping the inner ring at least on one end face. After installation, the doubled area contacts the drive shaft to precisely guide the inner ring. It is within the scope of the invention to lap both end faces of the inner ring in a same manner.

According to the invention, the flanges which together form a holder, are manufactured by a non-cutting deep drawing process. This process is useful for economical production on a large scale and permits at the same time a reduction of the wall thickness of the flanges and an associated lowering of the weight.

In accordance with the invention, the flanges are joined by a folded seam connection to form an effective, positive connection that can be easily manufactured. This cost-efficient and mechanical connection is particularly suited for series production. The subject matter of the invention can also be combined with housings already installed on the engine side or on the transmission side. For example, a flange of the holder can be centered in a receiving bore of the housing that is connected in one piece with the crankshaft housing of the internal combustion engine, whereby, for example, an outer surface area of a flange can be centered in a receiving bore, or the outer contour of the fastening clip can be fitted in a recess of the housing. Alternatively, the entire holder can be inserted in the receiving bore of the housing and then be centered.

The radial bearing assembly according to the invention can further be provided with two sealing elements to realize an effective seal on both sides of the rolling elements. These sealing elements improve the sealing quality of the radial bearing, thereby extending the service life, i.e. the useful life of the roller bearing. The sealing elements are spaced apart in the axial direction. The outside of the radial bearing is preferably provided with a protective disk to which a seal that is spaced axially in the direction of the rolling element is associated. The protective disk located on the opposite component except for a sealing gap has the objective to keep coarse contaminants away from the seal. According to the invention, the protective disk can also be formed as a preceding second seal. On the other hand, the slip seal prevents entry of contamination and/or liquids into the roller bearing and escape of lubricants from the inner ring of the radial bearing. Preferably, the sealing elements, i.e. the protective disk and the seal, are alternately securely fixed to the outer ring and the inner ring of the radial bearing to form a labyrinth.

BRIEF DESCRIPTION OF THE DRAWINGS

The invention will be described below in more detail with reference to four exemplified embodiments that are illustrated in nine figures, in which:

FIG. 1 shows schematically, a conventional arrangement of a drive located between a unit formed by an internal combustion engine and a transmission, and a driven front axle of a vehicle;

FIG. 2 shows a radial bearing of the invention with a thin-walled inner ring made in non-cutting fashion and arranged on a drive halfshaft, with the radial bearing received in a holder having two flanges;

FIG. 3 shows a radial bearing with an inner ring produced by machining and received in a holder having two flanges, with the radial bearing including two sealing elements for sealing each of both two sides;

FIG. 4 is a longitudinal cross section of a radial bearing similar to FIG. 2 in conjunction with the holder;

FIG. 5 is a front view of the radial bearing of FIG. 4;

FIG. 6 shows the radial bearing of FIG. 4, centered with respect to a housing via a flange of the holder;

FIG. 7 shows a radial bearing similar to FIG. 6, with the difference that the radial bearing is centered on the housing via a fastening clip;

DETAILED DESCRIPTION OF PREFERRED EMBODIMENTS

Figure 9:
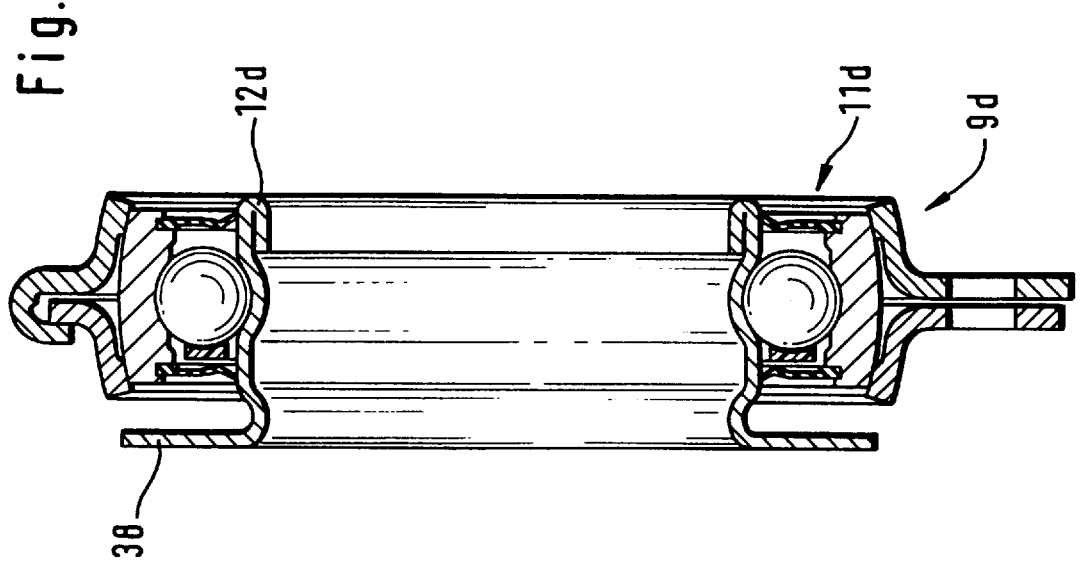
FIG. 9 shows a radial bearing having an inner ring formed on one end with a flanged profile angled radially outwardly.

FIG. 1 illustrates schematically the configuration of a conventional drive arrangement for a front wheel drive vehicle. Reference numeral 1 denotes an internal combustion engine mounted transversely in a vehicle and forming a unit with a transmission 2. Cardan shafts 3, 4 connect the transmission 2 with respective driven front wheels 5, 6. As a consequence of the offset disposition of the transmission with respect to a longitudinal axis of the vehicle, the cardan shaft 3 has a greater length than the opposite cardan shaft 4. The cardan shaft 3 is provided with a drive halfshaft 7 which is also of greater length and is supported by a radial bearing assembly 9 located next to a cardan joint 8, with the radial bearing assembly 9 being received in a holder 15 which is centered in a housing 10 securely fixed in place to the internal combustion engine 1.

FIG. 2 shows a longitudinal section of the radial bearing assembly 9a having a radial bearing 11a arranged directly on the drive halfshaft 7 by way of an inner ring 12a made in non-cutting fashion. An outer ring 13a of the radial bearing 11a is received in a holder 15 by way of a spherically shaped outer surface area 14. In order to realize a limited alignment of the radial bearing 11 in the holder 15, the holder 15 is made of two flanges 16, 17 and also formed with a receiving area 18 which matches the outer surface area 14 of the outer ring 13a. For manufacturing reasons, the receiving area 18 is so configured that each of the flanges 16, 17 bears only upon the marginal zones of the outer surface area 14. To reduce, both cost and weight, the flanges 16, 17 are manufactured by a noncutting deep-drawing process. The flanges 16, 17 are non-detachably connected to one another through several folded seam connections 19 spaced about the circumference. In addition, the flanges 16, 17 are provided with fastening clips 20, 21 which alternate with the folded seam connections 19. The fastening clips 20, 21 extend radially outwardly and include oblong holes 22 adapted to receive a screw connection. The inner ring 12a of the radial bearing 11a forms a race 24 for guiding rolling elements 23a. On its side facing away from the rolling elements 23a, the race 24 forms an annular bead 25 which bears upon the drive halfshaft 7 when the radial bearing 11a is installed. Both end faces of the inner ring 12a have a lap 26, 27 for bridging a radial gap "Y". The radial bearing 11a is sealed on both sides of the rolling element 23 by a seal 28, 29 which is securely fixed in place to the outer ring 13a and in sliding contact with the inner ring 12a.

FIG. 3 illustrates a different embodiment of a radial bearing assembly 9b having a radial bearing 11 which, unlike the radial bearing 11a of FIG. 2, has an inner ring 12b which is made through a machining process and thus of massive configuration. Compared to FIG. 2, the greater wall thickness of the inner ring 12b results in rolling elements 23b of reduced diameter. The sealing of the radial bearing 11b is also different in that each side of the rolling element 23b has two sealing elements. A protective disk 30, 31 is positioned in front of each of the seals 28, 29 at an axial distance thereto which are securely fixed against rotation to the outer ring 13b. The protective disk 30, 31 is securely fixed against rotation to the inner ring 12b and in sliding contact to the outer ring 13 or at formation of a sealing gap 32. The invention also covers protective disks which are configured as seals.

FIG. 4 shows a longitudinal section of the radial bearing assembly 9a of FIG. 2 in form of a component drawing, and FIG. 5 shows a front view thereof. The front view illustrates the configuration of the flange 17 which has three fastening clips 21 spaced about the circumference and provided with oblong holes 22. A folded seam connection 19 is arranged between the circumferentially spaced fastening clips 21 to effect a positive securement of both flanges 16, 17.

FIG. 6 illustrates the radial bearing assembly 9a of FIG. 2 attached to a housing 33. In order to center the radial bearing assembly 9a, the attachment flange 16 is centered in a receiving bore 34, whereby the housing 33 may be attached to the internal combustion engine 1 in a fixed position as a separate component, or may be connected in one piece with the internal combustion engine 1. The housing 33 therefore represents an alternative attachment of the radial bearing assembly 9a which could otherwise be attached directly to the internal combustion engine 1 in a fixed position.

FIG. 7 illustrates an alternative way of centering the radial bearing assembly 9a in the housing 33. The radial bearing assembly 9a is almost completely received in the housing 33 and can be centered by using the outer circumference region of the flange 16 in the region of the fastening clip 20 which is fitted in a corresponding recess 35 of the housing 33.

Figure 8:
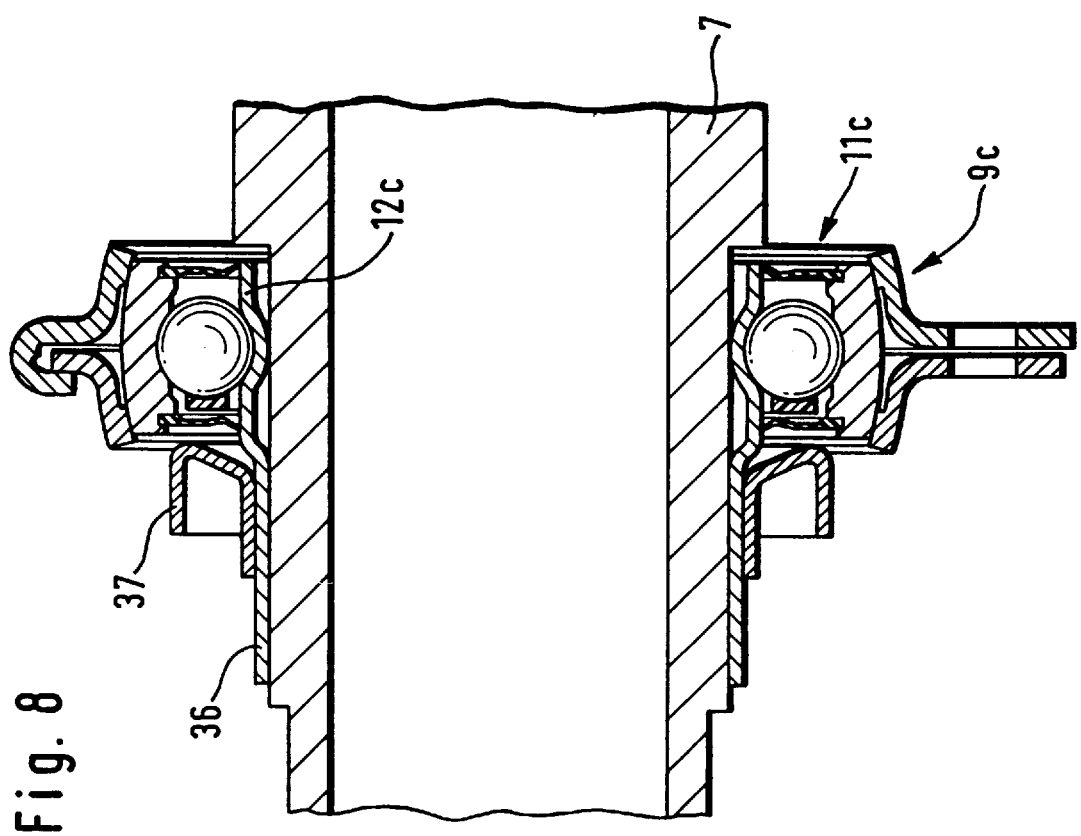
FIG. 8 shows a radial bearing arranged on a shaft and having an inner ring formed on one side with an axially projecting collar.

FIG. 8 illustrates the radial bearing assembly 9c having a radial bearing 11c connected to an inner ring 12c which includes a collar 36 protruding axially from one side of the inner ring 12c. This type of configuration of the inner ring permits a securement of the radial bearing 11c on the drive halfshaft 7, without requiring a separate intermediate sleeve, thereby optimizing the structure. According to FIG. 8, a protective ring 37 is further arranged on the collar 36 in immediate proximity of the radial bearing 11c to incorporate in the radial bearing 11c in particular an additional measure of protection.

The radial bearing assembly 9d illustrated in FIG. 9 includes an inner ring 12d which also projects in an axial direction across the width of the radial bearing 11d and is provided at its ends with a flanged profile 38 that projects radially outwardly. The flanged profile 38 may also be used for protecting the radial bearing 11d, for example, for effectively shielding the bearing against spray water.

What is claimed is:

1. A radial bearing assembly for a drive shaft of a motor vehicle, for connecting a transmission, which is flanged to a transversely mounted internal combustion engine, with a driven front wheel, said bearing assembly comprising:

a holder securely fixed in place on the side of the internal combustion engine and assembled from flanges; and a radial bearing, sealingly received in the holder, for supporting the drive shaft, said radial bearing including a massive inner ring which is made by a cutting procedure and arranged on the drive shaft, and an outer ring having a spherically shaped outer surface area, said radial bearing being receivable in an oriented position via the spherically shaped outer surface area of the outer ring in the holder.

2. The radial bearing assembly of claim 1, wherein the drive shaft is a hollow shaft.

3. The radial bearing assembly of claim 1, wherein the holder is formed by two positively joined flanges, with the holder having a receiving area which matches the spherical outer surface area of the outer ring.

4. The radial bearing assembly of claim 3, wherein the flanges of the holder are made from steel sheet by a non-cutting deep drawing process.

5. The radial bearing assembly of claim 3, wherein the flanges are joined together by means of a folded seam connection.

6. The radial bearing assembly of claim 3, wherein the flanges bear positively upon the outer ring only in a marginal zone of their outer surface.

7. The radial bearing assembly of claim 1, and further comprising a housing connected in one piece with the internal combustion engine for attachment of the holder.

8. The radial bearing assembly of claim 7, and further comprising fastening means for mounting the holder in an oriented position to one of the internal combustion engine and the housing.

9. The radial bearing assembly of claim 8, wherein at least one of the flanges of the holder is provided with fastening clips which are formed with oblong holes for receiving fastening screws.

10. The radial bearing assembly of claim 9, wherein the holder is centered by fitting an outer contour of the fastening clips in a recess of the housing.

11. The radial bearing assembly of claim 7, wherein the holder is centered in the housing via an outer surface area of the flanges.

12. The radial bearing assembly of claim 1, wherein the inner ring forms a race for receiving rolling elements, and further comprising two sealing elements on each side of the rolling elements for sealing the radial bearing.

13. The radial bearing assembly of claim 12, wherein two axially spaced-apart seals are respectively provided as sealing elements.

14. The radial bearing assembly of claim 12, and further comprising a protective disk, and a seal associated to the protective disk at an axial distance in the direction of the rolling elements.

15. The radial bearing assembly of claim 14, wherein the sealing elements on each side of the radial bearing are alternatingly securely fixed to the inner ring and the outer ring to create a labyrinth.

* * * * *